(12) United States Patent
Chan et al.

(10) Patent No.: US 8,046,955 B2
(45) Date of Patent: Nov. 1, 2011

(54) WATER DEVIATION UNIT FOR EXTERNAL WALL FIXTURES

(76) Inventors: James Chun Nam Chan, Richmond (CA); Jacob Rebel, Abbotsford (CA)

( * ) Notice: Subject to any disclaimer, the term of this patent is extended or adjusted under 35 U.S.C. 154(b) by 140 days.

(21) Appl. No.: 12/583,922

(22) Filed: Aug. 28, 2009

(65) Prior Publication Data

US 2009/0320384 A1    Dec. 31, 2009

(51) Int. Cl.
*E04F 17/00* (2006.01)

(52) U.S. Cl. ........... 52/61; 52/58; 52/60; 52/97; 52/209; 52/220.8; 52/302.1; 52/302.6

(58) Field of Classification Search ............... 52/97, 61, 52/60, 58, 302.1, 199, 212, 473, 209, 716.2, 52/220.8, 302.6; 174/66, 67; 312/328; 220/241–242; D8/353; D13/177; 248/205.1, 248/906

See application file for complete search history.

(56) References Cited

U.S. PATENT DOCUMENTS 6,151,838 A    11/2000    Husein
7,179,990 B2    2/2007    Kanazawa

*Primary Examiner* — Jeanette E. Chapman
(74) *Attorney, Agent, or Firm* — Frederick Kaufman Inc.

(57) ABSTRACT

A water deviation unit for external wall features comprises a frame shaped plate adaptable to be attached to a sheathing of a composite external wall and a box like subassembly projecting outwardly from and connecting to the frame shaped plate and provided centrally with a relatively large aperture. The box like subassembly includes: 1) a pair of spaced apart walls extending outwardly and perpendicularly in vertical planes from adjacent sides of said relatively large aperture and continuing above the latter; 2) upper and lower means for inclining used to deflect outwardly the water and connected laterally respectively at a top and a bottom of the pair of spaced apart walls; and 3) means for controlling an entrance and a withdrawal from an interior of the composite external, disposed between and joining the spaced apart walls.

2 Claims, 3 Drawing Sheets

WATER DEVIATION UNIT FOR EXTERNAL WALL FIXTURES

I. BACKGROUND OF THE INVENTION

1. Field of the Invention

The present invention relates to rain shielded mounting boxes used to pass through cladding of building walls and provide access from the outside to such features as gable, wall and soffit vents, electrical receptacles, light fixtures, dryer outlets, etc. The foregoing can be summarized by the above title.

2. Description of the Prior Art

The use of features, adapted to be attached to external composite walls, creates, due to water infiltration from rain into the aforementioned walls, a serious danger. Attempts have been made to eliminate or at least to alleviate this danger. Thus, U.S. Pat. No. 6,951,081, granted on Oct. 4, 2005 to Bonshor for a "WATER DEFLECTING APPARATUS" and U.S. Pat. No. 7,358,440, granted on Apr. 15, 2008 to Funk et al. for a "RAIN SHIELDED BOX FOR EXITING THROUGH SIDING" have addressed the problem.

Bonshor's patent discloses an apparatus mounted on a wall which includes a sheathing covered by a siding. The apparatus includes an inner, or rear, member including a mounting plate and a protrusion. The protrusion is rectangular having a top, a bottom, a right side and a left side. The top includes two portions which slop downwardly from a center of the top towards the sides. The slopping portions of the top deflect water towards the sides, where via passageways which extend from the top to the bottom of the protrusion the water is diverted. The passageways are formed by spaced-apart flanges and a connecting web. There is a skirt extending along the bottom of the rear member for diverting the water from the mounting plate toward the exterior of the siding.

The main disadvantage of Bonshor's apparatus resides in the use of two portions which slop downwardly from a center of the top of the protrusion towards the sides. These portions not being inclined downwardly towards the front of the protrusion, one can wonder whether the water intended to reach the passageways and be conveyed along the latter, before and by and large flows over external margins of the two portions. Another important disadvantage consists in dimensioning the transversal opening of the passageways in order to be suitable for different types of rain (from normal to torrential). Yet another disadvantage of Bonshor's apparatus resides in its complicated structure: the passageways are formed by spaced-apart flanges and a connecting web.

Funk's et al. patent refers to a rain shielded box comprising a large, nailing, rectangular flange, mounted vertically against an outside sheathing and a box-shaped structure. The large, nailing, rectangular flange is attached to a wall contacting end of the box-shaped structure. Funk's et al. rain shielded box incorporates as well a shoulder downwardly and outwardly inclined relative to the large, nailing, rectangular flange. A flange runs along the top surface of the box-shaped structure. The flange has a gap in the center and spaced away from this gap there is a slightly arcuate barrier used for deflecting water that hits the large, nailing, rectangular flange along the top and splashes back towards the flange. Then, water moves generally towards the two sides. Shoulders having a plurality of spaced apart notches or grooves spaced along a length thereof near an outer edge of each surface of a shoulder. Upon contacting the notches, the water is immediately bound to the surfaces of the shoulder by surface tension and flows down to a rain drip flange. The rain drip flange extends across the bottom surface of the box-shaped structure. A cover plate that fits over and locks to the box-shaped structure is used.

Funk's et al. rain shielded box has several structural and functional shortcomings. First, the large, nailing, rectangular flange is attached only at its sides with nails which are predisposed to rust. Second, the structure is complicated, a relatively large number of component being used. Third, diverting the water to the sides does not seem practical and efficient.

II. SUMMARY OF THE INVENTION

It will be seen, therefore, that a need exists for a water deviation unit for external wall fixtures that eliminates the disadvantages of the known solutions.

Thus, there is an objective of the present invention to devise a water deviation unit for external wall fixtures having a simple structure that provides an enhanced reliability and service life. Another objective of the present invention is to devise a water deviation unit for external wall fixtures wherein the bulk of water, instead of being collected and then conveyed to the exterior, is directly discarded.

Yet another objective of the present invention consists in developing a water deviation unit for external wall fixtures, which includes a communication between an interior of a composite wall and the surrounding environment, through which water condensation exits and the damage in time of a composite wall is prevented or delayed. Moreover, the communication must be so built as to prevent the penetration into the wall of insects and rodents.

Broadly stating a water deviation unit for external wall features, according to the present invention comprises a frame shaped plate and a box like subassembly projecting outwardly from and connecting to the frame shaped plate. The latter incorporates a relatively large aperture delimited by an upper and a lower horizontally extending straps joined at their lateral extremities by a pair of downwardly extending vertical straps. The relatively large aperture is defined peripherally by a top and a bottom horizontal lines and by a pair of spaced vertical lines. The frame shaped is provided with slotted attachment aperture zones, adapted to be used for securing with fasteners the frame shaped plate to a sheathing of an external wall.

The box like subassembly includes a pair of spaced apart walls extending vertically and outwardly from the frame shaped plate, coplanar with the spaced vertical lines, and continuing upwardly above the top horizontal line. Each one of the pair of spaced apart walls is provided with an upper and lower outwardly extending projections. The upper outwardly extending projection is positioned closely to a top of each of the spaced apart walls, while the lower, outwardly extending projection is situated at a bottom of each of the spaced apart walls and protrudes downwardly. The box like subassembly further including:

- a first upper inclined plane joining the pair of spaced apart walls and having a depth, when seen from a top, corresponding to a general depth of each the pair of spaced apart walls;
- a second upper inclined plane extending outwardly and downwardly from the first inclined plane, each lateral extremity of the second upper inclined plane being tangent to a zone of the upper, outwardly extending projection, with which it is congruent;
- a lower horizontal plane joined at its bottom to the lower horizontally extending strap and at the lateral ends to the spaced apart walls;

a lower inclined plane extending outwardly and downwardly from the lower horizontal plane; each lateral extremity of the lower inclined plane being tangent to a zone of the lower outwardly extending projections, with which it is congruent;

a vertical front plate joining an intersection located at a top, between the first upper, inclined plane and the second upper, inclined plane, and an intersection, located at a bottom, between said lower, horizontal plane and the lower inclined plane, and joining laterally the pair of spaced apart walls; the vertical front plate having an opening adaptable to be configured for different features;

a rigidly-spacing frame extending backwardly from the vertical front plate and abutting a front surface of the frame shaped plate; and means for controlling an entrance and a withdrawal from an interior of a composite external wall being disposed between the spaced apart walls, above a junction between the horizontally extending strap and first inclined plane, joining with its back the horizontally extending element and with its lateral sides the pair of spaced apart walls, the means for controlling an entrance and a withdrawal from an interior of a composite external wall extending transversally and forwardly from the horizontally extending element, stops short before an interior surface of a cladding of the composite external wall.

Broadly stating, as well, water deviation unit for external wall features comprising:

a frame shaped plate adaptable to be attached to a sheathing of a composite external wall; and a box like subassembly projecting outwardly from and connecting to the frame shaped plate and provided centrally with a relatively large aperture;

said box like subassembly including a pair of spaced apart walls extending outwardly and perpendicularly in vertical planes from adjacent sides of the relatively large aperture and continuing above the latter; the pair of spaced apart walls coinciding at their bottom with a bottom of the relatively large aperture;

upper means for inclining connected laterally to the pair of spaced apart walls and having a depth fitting a depth of the pair of spaced apart walls;

a lower horizontal plane joined at its bottom to the lower horizontally extending strap and at its lateral ends to the spaced apart walls;

lower means for inclining extending outwardly and downwardly from the lower horizontal plane, each lateral extremity of the lower means for inclining being contacting an adjacent wall of the pair of spaced apart walls;

rigidity means for spacing extending backwardly from the vertical front plate and abutting a front surface of the frame shaped plate; and means for controlling an entrance and a withdrawal from an interior of a composite external wall being disposed between and joining the spaced apart walls, the means for controlling an entrance and a withdrawal from an interior of a composite external wall extending transversally and forwardly from the frame shaped plate, stops short before an interior surface of a cladding of the composite external wall.

III. BRIEF DESCRIPTION OF THE DRAWINGS

Although the characteristic features of the invention will be particularly pointed out in the claims, the invention itself and the manner in which it may be made and used may be better understood by referring to the following description and accompanying drawings, where like reference numerals refer to like parts throughout the several views of the drawings, in which:

IV. DESCRIPTION OF THE PREFERRED EMBODIMENT

Figure 1:
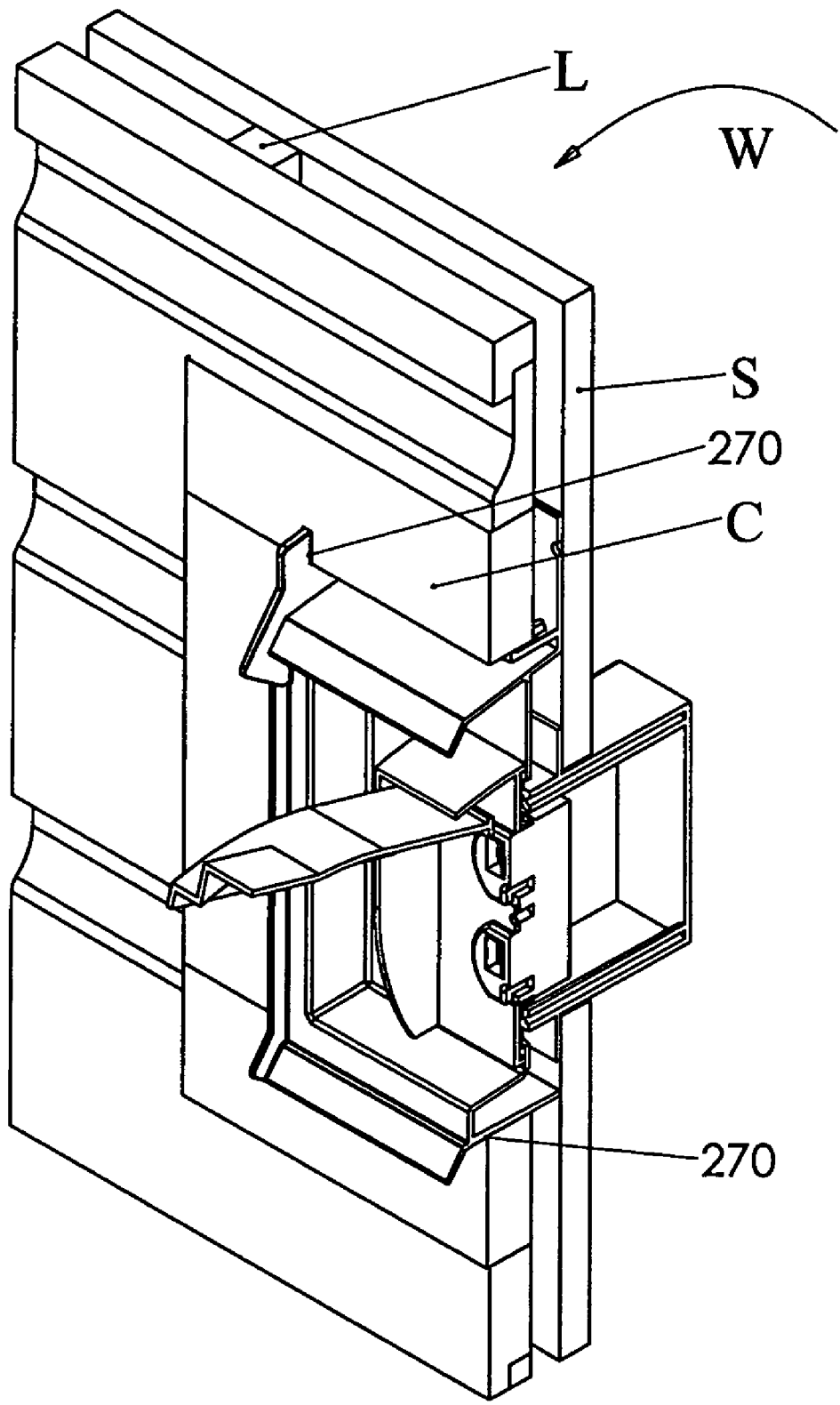
FIG. 1 is a sectional perspective view of a water deviation unit for external wall fixtures, in situ, seen after an intersection with a plan coplanar with its vertical plan of symmetry.
Figure 2:
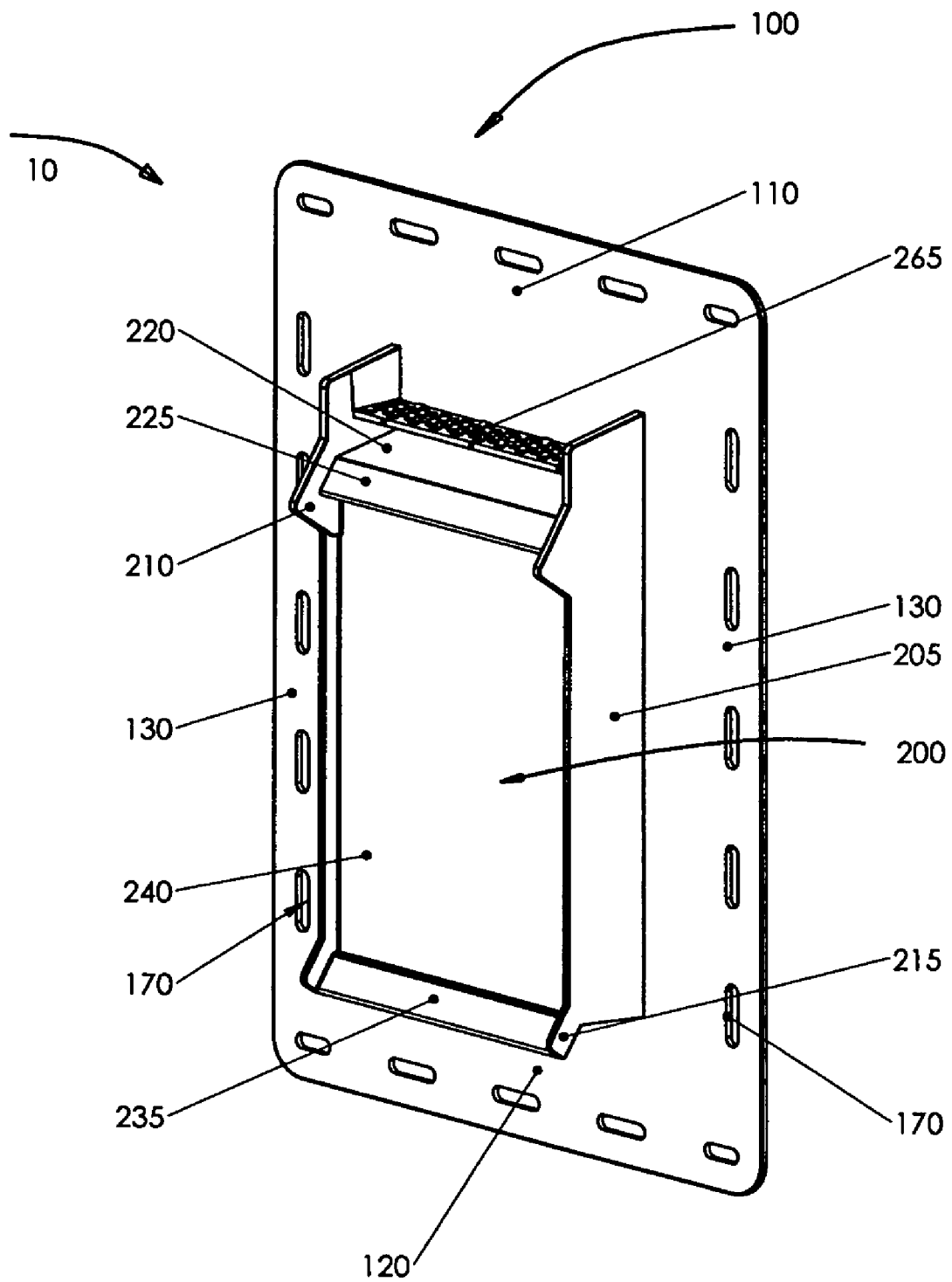
FIG. 2 is the same view of the unit shown in FIG. 1, but not installed on a composite wall.
Figure 3:
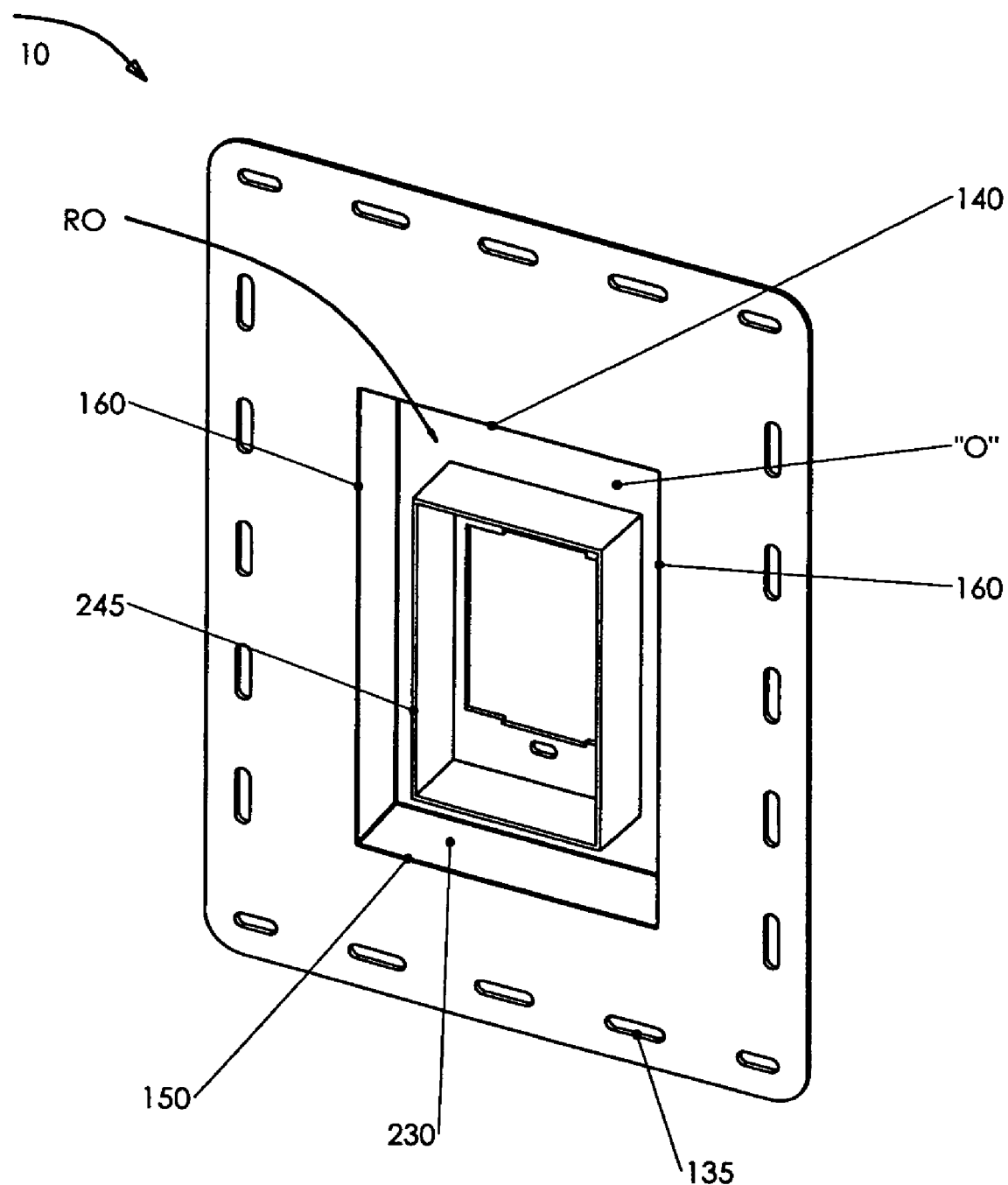
FIG. 3 is a perspective view of a water deviation unit for external wall fixtures seen from the back and showing its rigidity-spacing frame.

Referring to FIGS. 1-4, a water deviation unit for external wall fixtures is, generally, referenced as 10.

For convenience, in the following disclosure, it is to be agreed, that terms, such as "top", "bottom", "front", "back", "vertical", "horizontal", "upward", "posterior" and "anterior", "downward" and "outward" are conventionally employed with reference to the normal position in which unit 10 is used.

Water deviation unit for external wall fixtures 10 is mounted on a composite external wall that includes a sheathing S posteriorly situated and a cladding (siding) C anteriorly situated. Cladding C is usually made of stepped overlays of aluminum, vinyl, wood, etc. A plurality of laths L, interposed between sheathing S and cladding C, spaces apart and secures together the former and the later.

Broadly describing, with reference to FIGS. 1 through 4, water deviation unit for external wall fixtures 10 constitutes an integral structure including a frame shaped plate 100 and a box like subassembly 200 projecting outwardly from and connecting to frame shaped plate 100.

Describing now in detail, frame shaped plate 100 incorporates a relatively large rectangular aperture RO delimitated by an upper and a lower horizontally extending straps 110 and 120 joined at their lateral extremities by a pair of downwardly extending vertical straps 130. Rectangular aperture RO is defined peripherally by a top and a bottom horizontal lines 140 and 150 and a pair of spaced vertical lines 160.

Frame shaped plate 100 is provided on all its sides with slotted, attachment aperture zones 170, easy pierceable due to a relatively reduced thickness with respect to that of frame shaped plate 100. Fasteners such as nails or wood screws (not shown), are inserted via slotted, attachment aperture zones 170 for affixing frame shaped plate 100 to sheathing S.

Box like subassembly 200 includes
  a pair of spaced apart walls 205, extending perpendicularly and outwardly from frame shaped plate 100, coplanarly located with the pair of spaced vertical lines 160, and continuing upwardly above top horizontal line 140; each one of the pair of spaced apart walls 205 being provided with an upper and a lower, outwardly extending projections 210 and 215, respectively;
  upper outwardly extending projection 210 is situated closely to a top of each of the pair of spaced apart walls 205, while lower, outwardly extending projection 215 is situated at a bottom of each of the pair of spaced apart walls 205 and protrudes downwardly;
  a first upper inclined plane 220 joining the pair of spaced apart walls 205 and having, when seen from a top, in a plan view, a depth generally corresponding to an inward extent of each of the pair of spaced apart walls 205;

a second upper inclined plane 225 extending outwardly and downwardly from first inclined plane 220 is relatively more abruptly inclined and narrower than first upper inclined plane 220; each lateral extremity of second upper inclined plane 220 is tangent to a zone of upper, outwardly extending projection 210 with which it is congruent;

a lower horizontal plane 230 joining at a bottom the pair of spaced apart walls 205;

a lower inclined plane 235 extending outwardly and downwardly from lower horizontal plane 230 is similar, but relatively more inclined than second upper inclined plane 225; each lateral extremity of lower inclined plane 235 is tangent to a zone of lower, outwardly extending projection 215, with which it is congruent;

a vertical front plate 240 joining an intersection, located at a top, between first inclined plane 220 and second upper inclined plane 225 and an intersection, located at a bottom, between lower horizontal plane 230 and lower inclined plane 235, and joining laterally the pair of spaced apart walls 205;

a rigidity-spacing frame 245, similar to a box without lateral sides, extending backwardly from vertical front plate 240, abuts a front surface (not shown) of frame shaped plate 100; rigidity-spacing frame 245 has a rectangular shape with a periphery less than that of vertical front plate 240; rigidity-spacing frame 245 has its periphery equally shaped from the periphery of vertical front plate 240; optionally, rigidity-spacing frame 245 can be replaced by other mechanically equivalent rigidity features;

since water deviation unit for external wall fixtures 10 could be used with different external wall features, vertical front plate 240 and rigidity-spacing frame 245 will be designed, accordingly, with different opening-configurations; examples of such features are electrical sockets with self-closing flap covers, dryer vents with 90° elbows, ventilation exhausts with flap covers, water faucets, etc.

Water deviation unit for wall fixtures 10 is so shaped and sized that its main dimensions (when unit 10 in mounted in a working position) are chosen as follows:

when frame shaped plate 100 is secured to sheathing S, cladding C is so cut as to allow a forward partial protrusion, outside the cladding C, of the pair of spaced apart walls 205 and of first upper inclined plane 220, and a complete protrusion of second upper inclined plane 225 and of lower inclined plane 235; obviously, it results that in the working position, vertical front plate 240 is positionally retracted in a space between sheathing S and cladding C.

In one embodiment of the present invention, between spaced apart walls 205, above a junction between upper horizontally extending strap 110 and first upper inclined plane 220, a comb 265 generally positioned in a horizontal plane and joined with its back to horizontally extending element 110 and with its lateral sides to the pair of spaced apart walls 205. Comb 265 extends transversally and forwardly from horizontally extending element 110, but stops short before an interior surface (not shown) of cladding C. The role of comb 265 is to prevent an entrance from the exterior of insects and rodents and to release condensed air from an interior of composite external wall W. Optionally, a mesh or another similar feature, provided with a discontinuous surface, for example with perforations, can substitute comb 265 and accomplish the same function.

In order to render water deviation unit for external wall fixtures 10 watertight when in situ with a fixture, a caulking seam 270 is applied into a pair of junctions between the pair of spaced apart walls 205 and lading C and into a junction between lower horizontal plane 230 and cladding C.

First upper inclined plane 220, partially, and second upper inclined plane 225, completely, serve together with lower inclined plane 235 (also completely) to deflect water away from water deviation unit for external wall fixtures 10, in general and, especially, from vertical front plate 240.

What we claim is:

1. A water deviation unit for external wall features comprising:

a frame shaped plate and a box like subassembly projecting outwardly from and connecting to said frame shaped plate; said frame shaped plate incorporating a relatively large aperture delimitated by an upper and a lower horizontally extending straps joined at their lateral extremities by a pair of downwardly extending vertical straps; said relatively large aperture being defined peripherally by a top and a bottom horizontal lines and by a pair of spaced vertical lines; said frame shaped plate being provided with slotted attachment aperture zones, adapted to be used for securing with fasteners said frame shaped plate to a sheathing of an external wall;

said box like subassembly including a pair of spaced apart walls extending vertically and outwardly from said frame shaped plate, coplanar with said spaced vertical lines, and continuing upwardly above said top horizontal line; each one of said pair of spaced apart walls being provided with an upper and lower outwardly extending projections; said upper outwardly extending projection being positioned closely to a top of each of said spaced apart walls, while said lower, outwardly extending projection, being situated at a bottom of each of said spaced apart walls, protrudes downwardly;

a first upper inclined plane joining said pair of spaced apart walls and having a depth, when seen from a top, corresponds to a general depth of each said pair of spaced apart;

a second upper inclined plane extending outwardly and downwardly from said first inclined plane, each lateral extremity of said second upper inclined plane being tangent to a zone of said upper, outwardly extending projection, with which it is congruent;

a lower horizontal plane joining, at its bottom, said pair of spaced apart walls;

a lower inclined plane extending outwardly and downwardly from lower horizontal plane; each lateral extremity of said lower inclined plane being tangent to a zone of said lower outwardly extending projections, with which it is congruent;

a vertical front plate joining an intersection located at a top, between said first upper, inclined plane and said second upper, inclined plane, and an intersection, located at a bottom, between said lower, horizontal plane and said lower inclined plane, and joining laterally said pair of spaced apart walls; said vertical front plate having an opening adaptable to be configured for different features;

a rigidly-spacing frame extending backwardly from said vertical front plate and abutting a front surface of said frame shaped plate; and means for controlling an entrance and a withdrawal from an interior of a composite external wall being disposed between said spaced apart walls, above a junction between said horizontally extending strap and first inclined plane, joining with its back said horizontally extending element and with its lateral sides said pair of spaced apart walls, said means for controlling an entrance and a withdrawal from an interior of a composite external wall extending transversally and forwardly from said horizontally extending element, stops short before an interior surface of a cladding of said composite external wall.

2. A water deviation unit for external wall features comprising:

a frame shaped plate adaptable to be attached to a sheathing of a composite external wall; and a box like subassembly projecting outwardly from and connecting to said frame shaped plate and provided centrally with a relatively large aperture;

said box like subassembly including a pair of spaced apart walls extending outwardly and perpendicularly in vertical planes from adjacent sides of said relatively large aperture and continuing above the latter; said pair of spaced apart walls coinciding at their bottom with a bottom of said relatively large aperture;

upper means for inclining connected laterally to said pair of spaced apart walls and having a depth fitting a depth of said pair of spaced apart walls;

a lower horizontal plane connecting laterally to a bottom of said pair of spaced apart walls;

lower means for inclining extending outwardly and downwardly from said lower horizontal plane, each lateral extremity of said lower means for inclining being contacting an adjacent wall of said pair of spaced apart walls;

rigidity means for spacing extending backwardly from said vertical front plate and abutting a front surface of said frame shaped plate; and means for controlling an entrance and a withdrawal from an interior of a composite external wall being disposed between and joining said spaced apart walls, said means for controlling an entrance and a withdrawal from an interior of a composite external wall extending transversally and forwardly from said frame shaped plate, stops short before an interior surface of a cladding of said composite external wall.

* * * * *